US 6,751,310 B1

(12) United States Patent
Crossley

(10) Patent No.: US 6,751,310 B1
(45) Date of Patent: Jun. 15, 2004

(54) SYSTEM AND METHOD FOR PRIORITIZING TELEPHONE CALL CAMPAIGNS BASED ON CAMPAIGN PRODUCTIVITY

(75) Inventor: Colin D. Crossley, Hammersmith-London (GB)

(73) Assignee: Concerto Software, Inc., Westford, MA (US)

( * ) Notice: Subject to any disclaimer, the term of this patent is extended or adjusted under 35 U.S.C. 154(b) by 0 days.

(21) Appl. No.: 09/543,698

(22) Filed: Apr. 5, 2000

(51) Int. Cl.[7] ................................................ H04M 3/00
(52) U.S. Cl. ........................ 379/266.07; 379/265.02; 379/265.03; 379/265.05
(58) Field of Search ........................ 379/93.12, 265.01, 379/265.02, 265.05, 265.06, 266.04, 266.07

(56) References Cited

U.S. PATENT DOCUMENTS

| | | | | |
|---|---|---|---|---|
| 5,517,566 A | * | 5/1996 | Smith et al. ............ | 379/266.07 |
| 5,592,543 A | * | 1/1997 | Smith et al. ............ | 379/266.07 |
| 5,594,790 A | * | 1/1997 | Curreri et al. .......... | 379/266.07 |
| 5,594,791 A | * | 1/1997 | Szlam et al. ........... | 379/265.09 |
| 5,987,117 A | * | 11/1999 | McNeil et al. ........... | 379/265.1 |
| 6,584,191 B1 | * | 6/2003 | McPartlan et al. ...... | 379/265.02 |

* cited by examiner

Primary Examiner—Bing Bui
(74) Attorney, Agent, or Firm—Bourque & Associates P.A.

(57) ABSTRACT

A system and method automatically allocates agent resources and prioritizes call campaigns to maximize productivity of a call center by prioritizing call distribution along with agent resource allocation to those campaigns enjoying a high level of success, such as sales success, during a particular period of time. A plurality of call campaigns are grouped together to form a pacing group. Each call campaign in the pacing group is then assigned a campaign pacing ratio each having a sales success criteria. During the processing of the call campaigns, the pacing ratio of each call campaign will then be adjusted, whereby those campaigns realizing higher levels of current sales success will have their pacing ratios increased while those experiencing lower levels of current success will have their pacing ratios decreased.

11 Claims, 5 Drawing Sheets

SYSTEM AND METHOD FOR PRIORITIZING TELEPHONE CALL CAMPAIGNS BASED ON CAMPAIGN PRODUCTIVITY

FIELD OF THE INVENTION

This invention relates to telephony management systems and more particularly, to a system and method of prioritizing a plurality of telephone call campaigns based on campaign productivity.

BACKGROUND OF THE INVENTION

Many business and customer service organizations utilize automated call distribution systems which route incoming calls to operators or agents in one or more various departments. Such systems efficiently screen incoming calls and are capable of providing initial, preliminary information to the customer by automated voice in response to system prompts. As a need for an agent occurs, the inbound telephone system distributes the incoming call to an agent based on agent availability.

Additionally, credit collection agencies and other types of business utilize outbound automated dialing systems to efficiently reach customers by automatically dialing telephone numbers contained within a pre-selected group of call records. Upon detecting a live answer, the automated dialing system connects the call to an agent, typically based on agent availability. However, if agents receive incoming or outbound calls without consideration as to their capabilities or experience, many instances are presented where assigned agents are incapable of servicing a call. Placing such a call on hold while a more suitable agent is located is time consuming and cost inefficient, resulting in lost or abandoned calls.

In an attempt to direct specific incoming calls to pre-selected agents, some prior art systems utilize agent splits or hunt groups. These systems require incoming call campaigns to be pre-set such that specific calls are directed to pre-selected agents. However, these system are limited in that agents are not selected dynamically as the call campaign is active based on agent attributes. Rather, agents are bound to an incoming call campaign prior to activation of the call campaign.

More sophisticated prior are systems and methods, such as the system and method disclosed in commonly-owned U.S. Pat. No. 5,592,543, which is incorporated herein by reference, provide systems and methods for allocating agents to telephone call campaigns by a telephony system for servicing call records contained in call campaigns. Such systems allocate agent resources to service telephone call campaigns based on agent experience and expertise, and not solely on first availability.

With respect to outbound telephone call campaigns, it is a common occurrence to have a call center simultaneously process more than one call campaign. However, with currently available systems and methodologies, each campaign is individually run by the call center telephony system. Like the differing success levels realized by different agents, there are also differences in successes realized by different campaigns. The differences in success may be due to a wide variety of factors, including the type of script being used, the product or service being offered for sale or the price of the product or service. It could also be due other factors, such as the time at which a particular campaign is being run.

Telemarketing companies recognize the fact that certain campaigns will enjoy different success levels at different times and accordingly they quite often vary the types of campaigns that they run at particular times. However, in order to determine which types of campaigns are successful and which types are not, call centers are typically forced to initiate many campaigns at different times and then analyze the success levels achieved. As can be appreciated, this strategy is time consuming since it requires a significant amount of trial and error in order to compile the necessary results.

In addition, simple trial and error does not identify a specific problem with a campaign. For example a campaign may not be successful because it is initiated at the wrong time of day or wrong time of year or to a wrong class of prospective customers (e.g. male customers vs. female customers). Thus, in order to determine the reason why a campaign is or is not successful would require a great deal of trial and error. During this time period, the overall productivity of the call center would be adversely affected.

Accordingly, what is needed is an automated system and method of managing multiple call campaigns that eliminates the manual trial and error strategies that are currently being utilized by call center supervisors. Such a system would allow a call center to initiate multiple campaigns and determine which of those campaigns are successful and which are not and automatically adjust call pacing to take advantage of those call campaigns that are realizing success and reduce the call pacing to those campaigns that are not immediately successful. A desirable system would also be able to detect changes in success levels of call campaigns dynamically and adjust pacing levels accordingly to account for dynamic changes in success levels realized by the call campaigns.

SUMMARY OF THE INVENTION

In accordance with the present invention, a method for allocating agents to a plurality of telephone call campaigns by a telephony system is provided for servicing call records contained within the plurality of telephone call campaigns. The method is aimed at maximizing productivity of a call center by prioritizing call distribution along with agent resource allocation to those campaigns enjoying a high level of success during a particular period of time.

In one preferred embodiment, the method begins by providing a plurality of agent resources to participate in a plurality of call campaigns to be managed by a telephony system. The plurality of call campaigns are grouped together to form a pacing group. Each call campaign in the pacing group is then assigned a campaign pacing ratio which is a function of an assigned overall group pacing ratio and a fractional amount of agent resources allocated to each call campaign.

Next, a call center supervisor or other person responsible for the success or productivity of the call center establishes success criteria for each call campaign in the pacing group. Then, during the processing of the call campaigns, each connected call is monitored to determine if the established success criteria has been met. Based on a level of recognized success, the pacing ratio of each call campaign will then be adjusted, whereby those campaigns realizing higher levels of current success will have their pacing ratios increased while those experiencing lower levels of current success will have their pacing ratios decreased. Given a constant amount of agent resources to allocate amongst the plurality of call campaigns, the overall campaign group pacing ratio will remain constant.

Since the updating step occurs dynamically, as particular campaigns become increasingly or decreasingly successful, the system will reallocate the prioritization of calls thus taking advantage of those immediately successful call campaigns. Since call campaigns experiencing a high degree of current success will be assigned higher pacing indexes, more calls will be directed those campaigns and more agent resources will be allocated thereto to handle the increase in the number of calls initiated on those successful campaigns. Accordingly, the overall efficiency and productivity of the call center will be enhanced.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
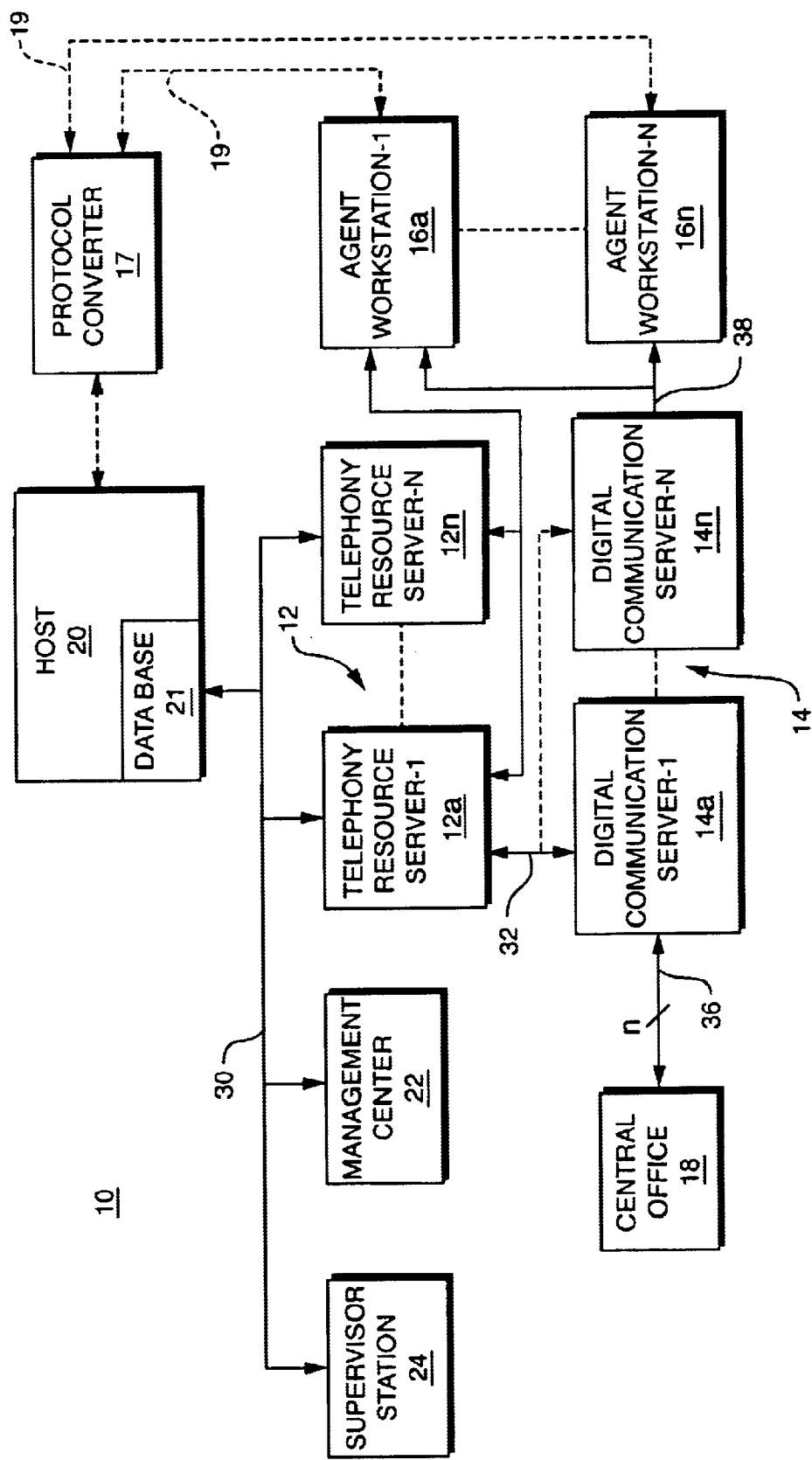
FIG. 1 is a diagrammatical representation of a telephony system capable of call processing in accordance with the present invention.

A telephony system 10, FIG. 1, capable of controlling and combining inbound call processing and outbound dialing automation includes a telephony resource server 12, coupled to a digital communication server 14 as well as a supervisor station 24 and management center 22. A telephony resource server 12, digital communication server 14, supervisor station 24 and management center 22, may be provided, for example, as the Davox Unison® system manufactured by Davox Corporation, Westford, Mass.

The system may provide a plurality of telephony resource servers 12a–12n, generally denoted as 12, for increased capabilities. Similarly, the system may provide a plurality of digital communication servers 14 a–14n, generally denoted as 14.

Telephony resource server 12 initiates and maintains outgoing call campaigns and integrates incoming call center activities with a customer provided inbound call center which may be coupled to the present system as another digital communication server. Outgoing call campaign parameters are generated by the supervisor/customer at the supervisor station 24 in response to menu-driven prompts. Call campaigns may be monitored by one or more management centers 22 once initiated by telephony resource server 12.

Telephony resource server 12 comprises various functions, discussed below in greater detail in conjunction with FIG. 2, which interact with the other components of the telephony platform 10 to perform the active call campaigns.

For outgoing call campaigns initiated by the supervisor/customer, telephony resource server 12 obtains a group of call records from a database 21 within a host system 20 via signal path 30. The telephony resource server 12 processes the call records as directed by preselected system scripts and sends a request to digital communication server 14 to dial a telephone number contained within the call record.

Digital communication server 14 detects a dial tone, dials a telephone number over a trunk line 36 to the central telephone company switching office 18. Once a call is answered, the digital communication server forwards the voice portion of the call over voice path 38 to the headset of a preselected operator (not shown) located at one of a plurality of agent workstations 16a–16n, generally denoted as 16. The agents are selected by the telephony resource server 12 in response to the initial call campaign parameters established by the supervisor/customer at the supervisor station 24.

In one embodiment, the agent at agent workstation 16 interfaces with the telephony resource server 12 over signal path 34 to obtain customer information from host system 20 over signal path 30. In another embodiment, the agent interacts directly with host 20 and data path 19 through protocol converter 17. In response, host system 20 sends data contained within and/or associated with each call record to the requesting agent workstation 16.

For inbound calls, the central office 18 typically sends incoming calls to digital communication server 14 via a plurality of T1 type preselected telephone lines within trunk 36. Alternatively, an ACD (Automated Call Distributor) which is generally in existence at the customer location may handle such incoming calls. In response, digital communication server 14 sends an incoming call signal over signal path 32 to telephony resource server 12 for inbound call processing. Telephony resource server 12 processes the incoming calls in accordance with preselected system scripts, discussed in greater detail in conjunction with FIG. 2, below, sending data over signal path 34 and directing digital communication server 14 to send the incoming call to a preselected agent at agent workstation 16 over voice path 38.

Figure 2A:
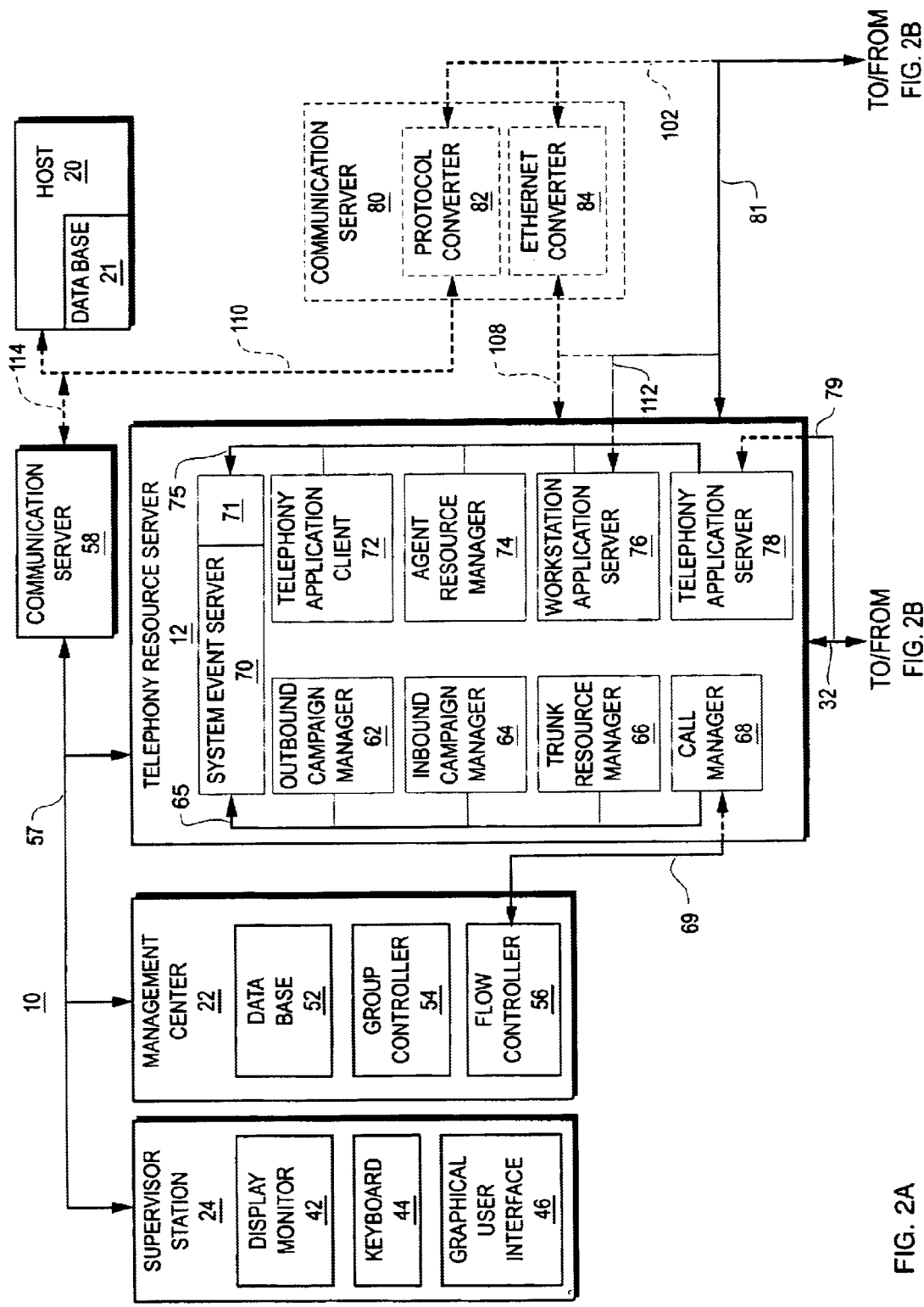
FIGS. 2A and 2B are a diagrammatical representation showing in more detailed description the telephony system of FIG. 1.
Figure 2B:
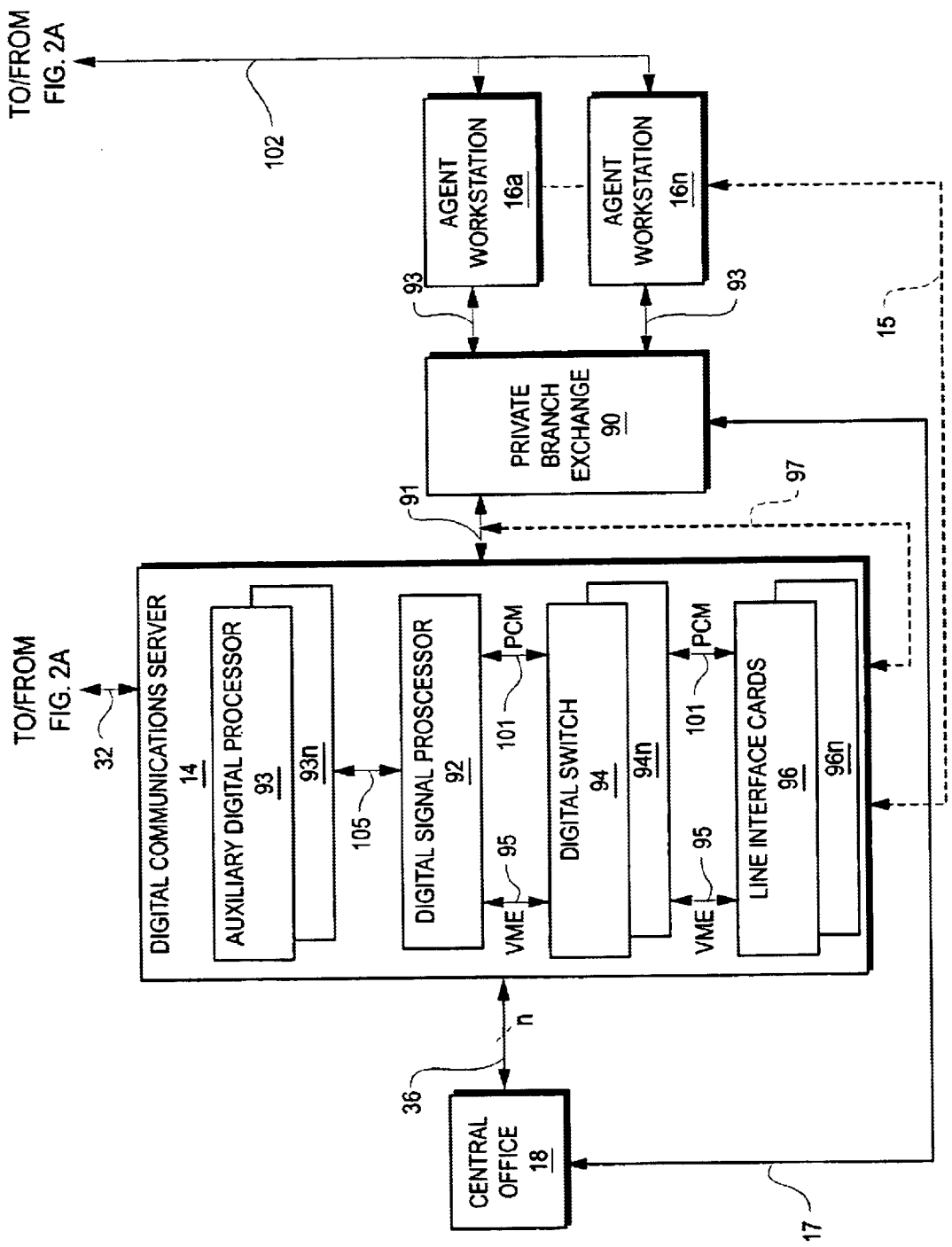

Referring now to FIG. 2, the functional components of the telephony platform 10 are discussed in greater detail. The supervisor/customer logs in at supervisor station 24 to establish inbound and outbound call campaigns. Supervisor station 24 typically includes a display monitor 42 featuring color bitmapped graphics, a keyboard 44 and a graphical supervisor/customer interface 46 and is further described in U.S. Pat. No. 5,343,518, issued on Aug. 30, 1994, and assigned to the assignee of the present invention and incorporated herein by reference. The supervisor station 24 may be provided, for example, as a SUN IPC model workstation manufactured by Sun Microsystems, Chelmsford, Mass.

The supervisor/customer establishes both inbound and outbound call campaigns in response to menu-driven prompts provided by the graphical supervisor/customer interface 46. System scripts are generated through a layered approach to define system behavior to the extent necessary for the desired call campaign. The highest layer interface is simply a form to be filled in by the supervisor/customer based on a specific call campaign application, for example, an outbound dialing call campaign versus an inbound call campaign. If a more complex set of criteria is necessary or desired, the supervisor/customer may be presented with a lower layer comprising more complicated forms to allow the supervisor/customer to better define the behavior of the telephony platform 10.

A system script is activated when a defined event occurs, such as a call record to dial, an incoming call is received, a function key is pressed at an agent workstation 16, etc. A script may also be bound by the supervisor/customer to specific events, being activated when the event is posted by the system, such as when a call is completed, a time of day, etc.

In addition to system scripts, the supervisor/customer generates other campaign parameters for each call campaign, such as how the telephony resource server 12 should respond in the event of a busy dial tone, a no answer dial tone, etc. Further, agent and trunk parameters are defined by the supervisor/customer, discussed below in greater detail, as well as how the system should process the particular call campaigns. Once the call campaigns have been defined, the supervisor/customer notifies the telephony resource server 12 over signal path 30 that the particular call campaign is ready to start.

For an outbound call campaign, the outbound campaign manager 62 of telephony resource server 12 is directed to begin the call campaign. The outbound campaign manager 62 receives a group of call records from a host system 20, each call record including a telephone number for the outbound campaign manager 62 to dial. Depending on the type of host system 20 used to generate the batch of call records, a communication server 58 may be required to permit the host system 20 to communicate with the telephony resource server 12. Communication server 58 may be a protocol converter used for converting the communication protocol used by host system 20, typically an SNA or Token-Ring protocol, over bus 114, to the communication protocol utilized by the telephony resource server, typically a TCP/IP protocol, over bus 57.

The group of call records sent to the outbound campaign manager 62 is selected in response to one or more call record selection criteria initially generated by the supervisor/customer. The call record selection criteria defines and groups call records with similar characteristics within the call record database 21 of host system 20. As records are selected, system scripts initially generated by the supervisor/customer are activated to initiate dialing activity. The supervisor/customer may monitor the processing of the telephony system by the outbound campaign manager 62 at the management center 22. Management center 22 typically includes a database 52 for storing the call records downloaded from host system 20, a group controller 54 and a flow controller 56, and is further described in part in commonly-owned U.S. Pat. No. 5,343,518.

Flow controller 56 is provided for linking a plurality of call campaigns in a selected order and to apply the call campaigns to the telephony resource server 12 via the call manager 68 over signal path 69. The call manager 68 processes and formulates the outbound call campaign as directed by the preselected campaign parameters or system scripts, and forwards the outbound call campaign to the outbound campaign manager 62. The flow controller may also change the order in which the call campaigns are joined, all such changes being performed in real-time, even after being applied by the telephony resource server 12.

Group controller 54 is provided for monitoring the call campaign in real-time. The supervisor/customer may modify the particular outbound call campaign, as well as the inbound call campaign discussed below, by changing the preselected campaign parameters, system scripts or call record selection criteria. All such changes are performed in real time. The outbound campaign manager 62 provides a supervisor/customer interface to enable modifications to the outbound call campaign while the campaign is active in response to modifications made by the supervisor/customer.

The campaign parameters initially generated by the supervisor/customer further include campaign resources such as agents and/or outbound dialing trunks which possess predetermined resource attributes. A telephony application client 72 (discussed in more detail below) sends a request to the agent resource manager 74 for an agent possessing specific agent attributes as defined by the supervisor/customer. The agent resource manager 74 monitors available agents possessing the specified agent attributes and upon availability, allocates an agent possessing the specified attributes to the telephony application client 72.

Similarly, the telephony application client 72 sends a request to the trunk resource manager 68 for an outbound trunk possessing specific trunk attributes as defined by the supervisor/customer. The trunk resource manager 68 monitors available trunks possessing the specified trunk attributes such as least cost routing, ISDN trunk, direct line, etc. and allocates a trunk possessing the specified attributes to the telephony application client 72.

The agent resource manager 74 and the trunk resource manager 68 report particular agent log-ons and log-offs and trunk availabilities to the system event server 70, discussed below in greater detail, thereby providing real-time detailed information on the agent and trunk resources. By monitoring the stream of events occurring within the system, the outbound campaign manager 62 determines when it is time to initiate each new outbound dial. Once an agent resource and/or trunk resource is available to service the outbound dial, the outbound campaign manager 62 obtains a call record and initiates the telephony application client 72, preselected by the supervisor/customer at the start of the particular outbound call campaign, to process the call record.

The telephony application client 72 includes programs, campaign call scripts, or other processes that make use of the telephony platform 10 resources to perform telephony operations. The telephony application client 72 may be started by the outbound campaign manager 62 to process a call record or an outbound dialing application or the inbound campaign manager 64 to process an incoming call, or it may be started by the system event server 70 to perform some programmed response to a system defined event.

The telephony application client 72 sends a request to the telephony application server 78 to initiate a call according to the parameters generated by the outbound campaign manager 62.

The request to generate an outbound call from the telephony application client 72 includes dialing instructions such as the maximum number of rings allowed before declaring a no answer. The telephony application server 78 further directs the digital communication server 14 to wait and listen for predetermined signal patterns and to return a status signal indicating what signal pattern was detected. Predetermined signal patterns include busy tones, voice detection, answering machine, modem/fax signals, etc.

The digital communication server 14 detects, reports, and generates a variety of signals, and detects specific states on a particular digital switch port using digital signal processor 92. Further, digital signal processor 92 is capable of playing digitized voice, as well as recording and play back of incoming voice via PCM bus 101. Digital voice messages are stored on disk, and transferred from the telephony resource server 12 over path 32, and referenced by campaign call scripts directed by telephony application server 78 over signal path 79. An auxiliary digital signal processor 93 may be used for expansion capability. Those skilled in the art will recognize that a plurality of auxiliary digital signal processors 93 a may be used for increased expansion capability.

Communication between the digital signal processor 92 and the auxiliary digital signal processors 93a is accomplished 12 by a plurality of ethernet buses 105.

Digital signal processor 92 interfaces with digital switch 94 over VME communication bus 95 and PCM communication bus 101. Digital switch 94 includes switch ports which may attach to T1 channel 36, agent headsets of agent workstations 16 and private branch exchange 90 extensions. A plurality of digital switches 94n may be used for increased switching capability.

Local internal switch 94 interfaces with line interface card 96 over VME communication bus 95 and PCM communication bus 101 and provides for rapid switching between an agent and the incoming/outgoing trunk lines. Line interface card 96 optionally interface with the agent workstations 16 directly over voice path 15 or via private branch exchange 90, over TI telephone lines 97, to provide T1, analog and audio interface functions. A plurality of line interface cards 96n may be used for increased capability.

The private branch exchange 90 sends voice path 93 to agent workstation 16 to connect the outside third party, reached by an outbound call record dial, or an inbound calling party, to the headset of the agent selected by the outbound campaign manager 62 or inbound campaign manager 64.

Three-way connections between the agent, outside third party and the agent's supervisor may be requested by the agent after the call has been answered, enabling features such as conferencing and consulting via the digital switch 94 and serviced by the telephony application server 78.

Upon receiving an outbound call over voice path 93 to the agent's headset, the system automatically provides customer information contained within the call record from the host to the agent's workstation. In the preferred embodiment, agent workstations 16 are data terminals which utilize an ethernet network. Direct communication may be made with the telephony resource server 12 over bus 81, and in particular to the workstation application server 76 over bus 112 which also utilizes an ethernet network.

The workstation application server 76 interfaces with the host system 20 by means of a forms package which has the ability to access the call record database containing customer information and to forward the customer information to the workstation screen at the agent workstation 16. Further, the forms package has the ability to update this database based on responses by the agent at the agent workstation 16 to forms package prompts.

In an additional embodiment, the agent workstation 16 may be a dumb terminal utilizing a proprietary asynchronous communication protocol over line 102 requiring a communication server 80, illustrated in dashed lines, as a protocol converter. To permit communication with the telephony resource server 12 over bus 108, and in particular with the workstation application server 76, over bus 112, proprietary asynchronous line 102 is converted by ethernet converter 84 to an ethernet network thereby allowing compatibility with workstation application server 76. For direct communication with the host system 20 over bus 110, proprietary asynchronous line 102 is converted to the protocol utilized by host system 20, typically SNA or Token-Ring, by protocol converter 82. The telephony resource server 12 further includes a system event server 70 for providing the supervisor/customer real-time access to the current status and detail information on campaigns, agents, trunks, etc. The supervisor/customer may access this information through graphical supervisor/customer interface 46 at the supervisor workstation 24, as well as through a standard spread sheet or reporting package.

The system event server 70 is the central focal point for posting system events and maintaining real-time information as to current system activity. All of the functional components within the telephony resource server 12 communicate with the system event server 70 as indicated by signal paths 65 and 75 to maintain current system activity. All system events which can be posted by the system are predefined by the supervisor/customer and posted in an event database 71 within the system event server 70 as specific events occur. As system events are posted in the event database, system statistics, stored in the statistics database within the system event server 70, are updated thereby providing the supervisor/customer with real-time system information.

Figure 3:
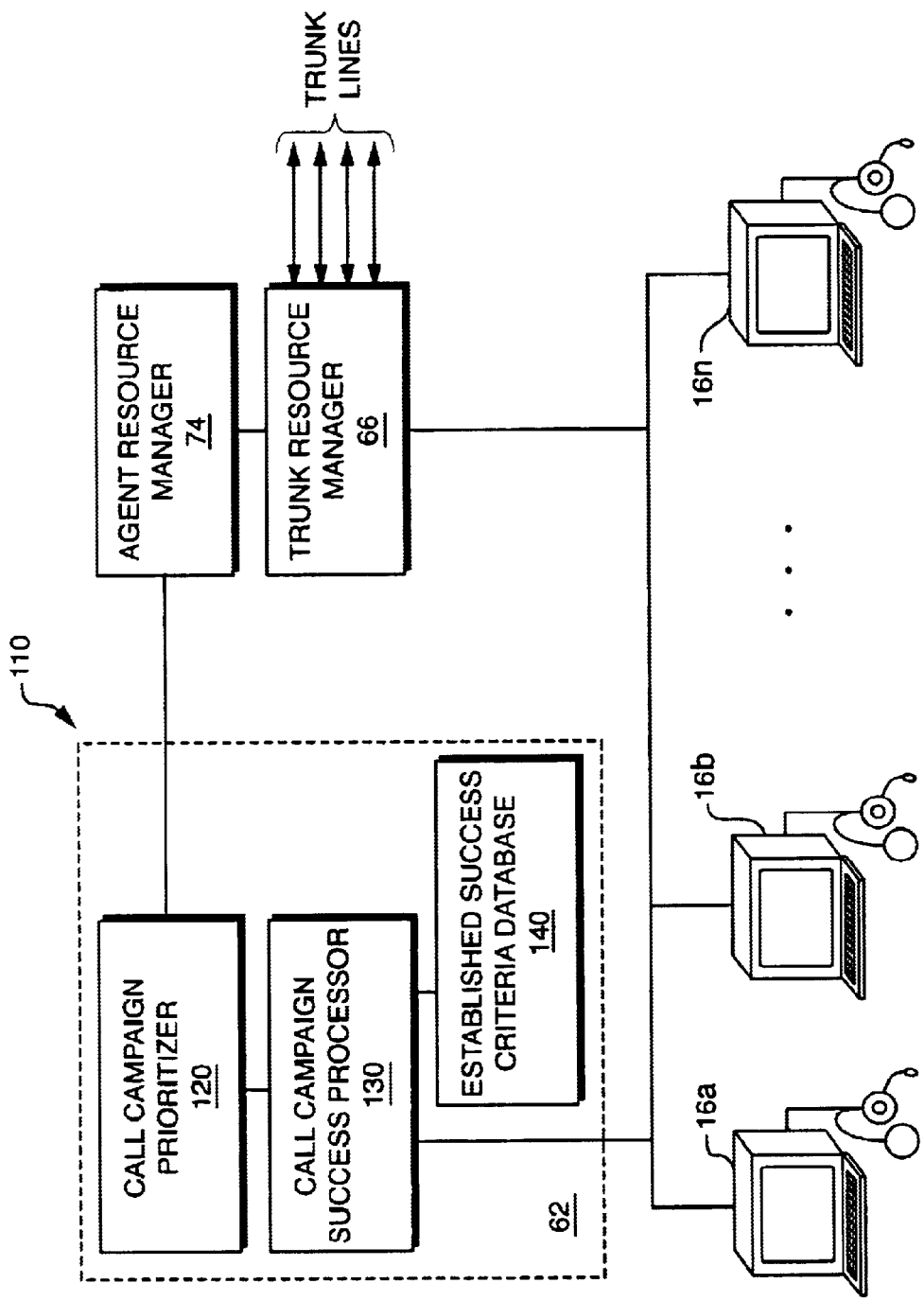
FIG. 3 is a diagrammatical representation of the outbound campaign manager of FIG. 2, which is configured to adjust call pacing and agent resource allocation to take advantage of successful campaigns according to the present invention.

Turning now to FIG. 3, an automated system 200 for prioritizing a plurality of call campaigns to maximize call center productivity is shown. The automated system 200 includes an outbound campaign processor 62 as explained above. However, in this specific embodiment, the outbound campaign processor 62 further includes a call campaign prioritizer 120, which works in connection with a call campaign success processor 130 to automatically identify if any of the call campaigns being managed by the telephony system 10 (FIGS. 1 and 2) are realizing greater current success than any of the other campaigns presently running.

The call campaign success processor monitors each call connected to a call center agent 16 by the telephony system 10 and compares the result of each call with established success criteria that is stored in a success criteria database 140 to determine if the established success criteria has been satisfied. Of course, since the telephony system will be managing a plurality of different call campaigns simultaneously, there may be differing success criteria for each call campaign. As will be discussed in greater detail below, when the success processor 130 identifies one or more successful campaigns, then the call campaign prioritizer 120 will adjust the pacing ratios of each campaign to increase the number of calls being made on successful campaigns and decrease the number of calls being made on unsuccessful campaigns.

The call campaign processor 120 will work in connection with the agent resource manager 74 and trunk resource manager 66 to ensure that sufficient agent and trunk resources are allocated and available to participate in the plurality of call campaigns that are being simultaneously run by the telephony system 10.

The goal of the system and method of the present invention is to automatically control call pacing based on the current productivities of a plurality of call campaigns being simultaneously managed by a telephony system. Call pacing is a function of a pacing ratio assigned to a call campaign. A pacing ration may be fixed or it may be adjusted, either manually or automatically, in response to conditions monitored by a telephony system or system supervisor.

If an agent is logged onto multiple call campaigns, then the agent is considered to be a "resource" for each of the campaigns or, more precisely, a "fractional resource" for each campaign. Campaigns having higher pacing ratios would use more of an agent resource than campaigns having lower pacing ratios.

However, in order to automatically control the call pacing in one campaign, the system and method must consider all of the campaigns that are competing for control of the agent resources that are assigned to the plurality of campaigns.

The system and method cannot simply raise one or more campaign pacing ratios since there are a finite number of agent resources available for the entire plurality of campaigns being managed by the telephony system. Accordingly, if one or more pacing ratios are raised, then one or more of the pacing ratios associated with the other campaigns must be reduced. In the preferred embodiment, where the productivity of a call center is the ultimate goal, then agent resources would be taken away from call campaigns that are not realizing current success and applied to those campaigns that are currently successful.

In order to effectively manage resources that are being shared by more than one campaign, the disclosed system and method establishes a pacing group. Individual campaigns are created and collectively are assigned a standard pacing method, which may be a standard ratio or automatic percentage as are well known to those skilled in the art. As one or more campaign included in the pacing group becomes successful, then that campaign will take agent resources from the other campaigns in the pacing group so that more calls can be placed on the successful campaign(s). Thus, the group of campaigns included in the pacing group would collectively maintain a set overall pacing level.

Figure 4:
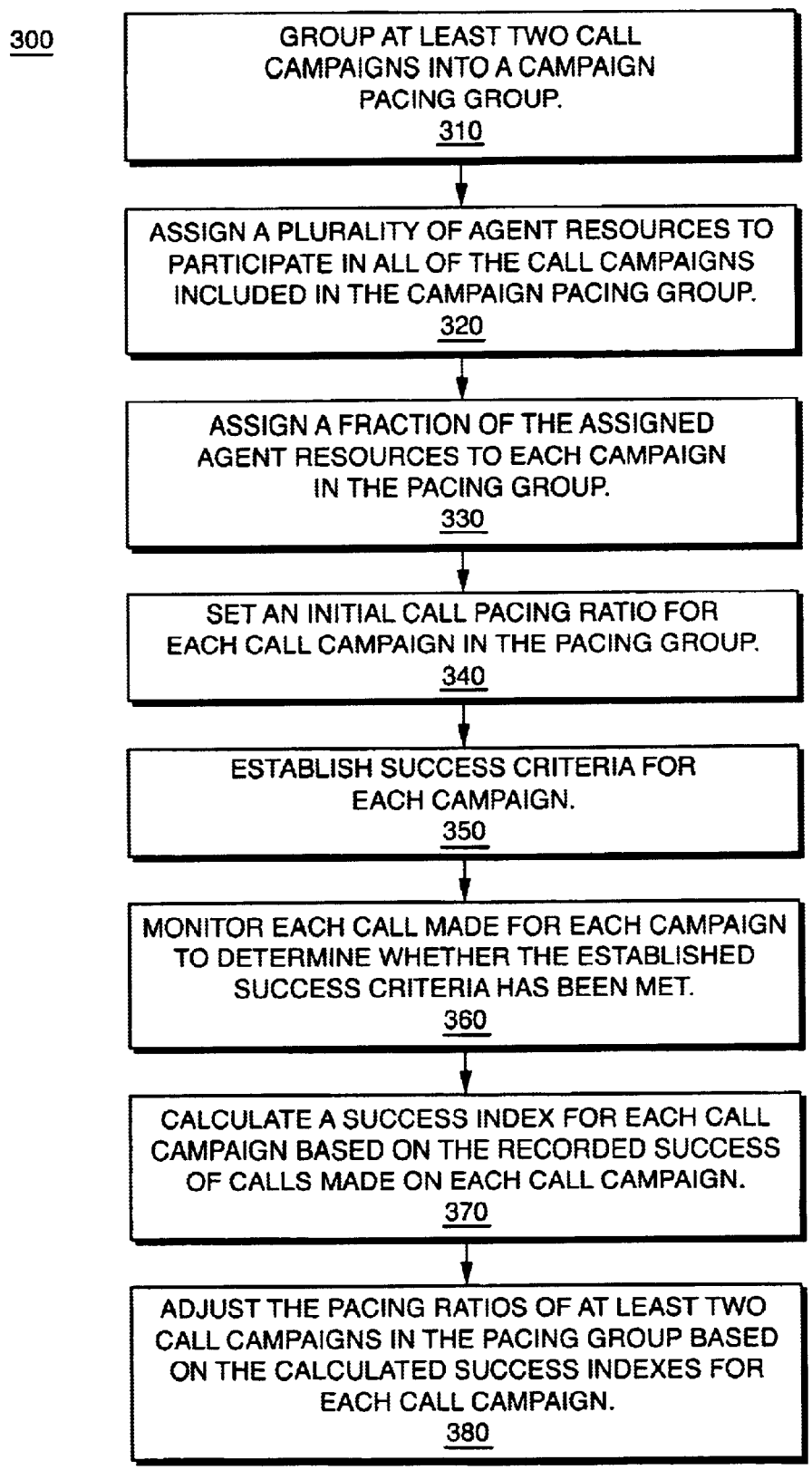
FIG. 4. is a flow diagram showing the steps of a method of prioritizing a plurality of telephone campaigns to increase call center productivity according to the present invention.

Referring now to FIG. 4, a method 300 of prioritizing a plurality of telephone call campaigns to increase the productivity of a call center including a telephony system for managing the plurality of campaigns is provided. The method begins by grouping at least two call campaigns into a campaign pacing group, step 310. Then a plurality of agent resources are assigned by the telephony system to participate in all of the call campaigns included in the campaign pacing group, step 320.

Once the pacing group is established and the agent resources are assigned thereto, a fraction of the assigned agent resources is assigned to each campaign in the pacing group, step 330. For example, if a pacing group includes four call campaigns, when the campaign group is initiated, the call center supervisor may desire to assign one-fourth of the agent resources to each campaign. Of course, unequal initial agent resource allocations would also be contemplated by the invention.

Then, in step 340, an initial call pacing ratio is set for each call campaign in the pacing group. The initial call pacing ratios are based on an overall pacing group pacing ratio and the fraction of agent resources allocated to each call campaign in step 330. For example, the overall pacing group pacing ratio may be set as a number of telephone lines assigned to a number of agents, such as three lines for two agents.

After the initial pacing ratios are established, then the call center supervisor or other individual responsible for the success of each call campaign establishes success criteria for each campaign, step 350. Then, during the processing of the pacing group, each call made for each campaign is monitored and whether or not the established success criteria has been satisfied is recorded, step 360. In step 370, a success index is calculated for each call campaign based on the recorded success of calls made on each call campaign.

Based on the calculated success indexes for each call campaign in the pacing group, the pacing ratios of at least two call campaigns in the pacing group are adjusted, step 380. Success indexes may be calculated at predetermined intervals, for example every fifteen minutes, every hour or the like.

The pacing ratio(s) of successful call campaign(s) are increased while the pacing ratio(s) of unsuccessful call campaign(s) are reduced. The steps of monitoring each call to determine of it is successful as well as the steps of calculating success indexes and adjusting the pacing ratios of the call campaigns are repeated during the processing of the pacing group.

There are a variety of alternative strategies that may be employed to adjust the pacing ratios of the call campaigns included in the pacing group. A first strategy contemplates assigning a reflective pacing ratio to each campaign in the pacing group. Using a reflective pacing ratio strategy, campaigns are given priority over others in their pacing group reflective of how much more successful they are than the remainder of campaigns in the group. For example, if campaign A realizes sixty-two percent (62%) of the total sales of all of the campaigns in the pacing group, then, using a reflective ratio strategy, 62% of the calls made in the pacing group would be made on campaign A.

Another strategy would be a weighted reflective ratio strategy. This would be similar to a basic reflective ratio strategy. However, any increase would be in addition to the preset weight. For example, assume a preset weight of 10% and a campaign group consisting of three campaigns that achieve the following sales results:

Campaign A=75% of sales

Campaign B=19% of sales

Campaign C=6% of sales.

Since the preset weighting amount is set at 10%, each campaign would automatically be assigned 10% of the calls plus a percentage of what is left (the remaining 70%) based on the sales percentages. Thus, if 100 calls are to be placed, then the calls will be allocated to the three campaigns as follows:

| Campaign A | = 10% + (75% of 70) calls |
| --- | --- |
|  | = 10 + 52.5 = 62.5 calls |
| Campaign B | = 10% + (19% of 70) calls |
|  | = 10 + 13.3 = 23.3 calls |
| Campaign C | = 10% + (9% of 70) calls |
|  | = 10 + 4.2 = 14.2 calls |

The weighted strategy allows supervisors to effectively set a minimum level of calls for a campaign. In the above example, the weight was quite high. Thus, the best campaigns will be dialed more while still allowing the poorer performing campaigns to receive a small percentage of outgoing calls.

Other strategies, such as a shared remainder strategy or a preset ratio strategy could also be utilized. With a shared remainder strategy, the campaign realizing the highest current level of success would receive a predetermined percentage of calls (e.g. 90%), while the remaining campaigns would share the remaining percentage (e.g. 10%) equally. Using a preset ratio strategy, a supervisor could assign preset percentages of calls for campaigns as they rank in terms of success indexes. For example, the top campaign could get 80% of the calls, the next most successful campaign could get 10% of the calls, etc.

Accordingly, productivity based campaign pacing allows a call center supervisor to be as creative as he or she desires with a plurality of campaigns and group the campaigns together into pacing groups and allow the campaigns to compete against each other for agent resources based on their recognized success. One significant benefit of productivity based campaign pacing is that a call center customer (i.e. a product or service provider) will not suffer from the introduction of an unsuccessful campaign in order to find out that it is indeed unsuccessful. Instead, the system will automatically detect that a campaign is unsuccessful and will reduce the level of calls that it makes on that campaign. It will simultaneously detect those campaigns that are currently successful and increase the level of calls made to those campaigns. Finally, since the system dynamically adjusts call pacing, an unsuccessful campaign that begins to become increasingly successful will have its pacing level increased in real time.

Modifications and substitutions by one of ordinary skill in the art are considered to be within the scope of the present invention which is not to be limited except by the claims which follow.

What is claimed is:

1. A method of prioritizing a plurality of telephone call campaigns to increase productivity of a call center including a telephony system for managing said plurality of call campaigns, said method comprising the steps of:

grouping at least two call campaigns into a campaign group;

providing a plurality of call center agent resources to participate in said campaign group;

establishing a sales success criteria for each of said at least two call campaigns in said campaign group;

monitoring a plurality of calls associated with each said at least two call campaigns to determine if said established sales success criteria has been met; and allocating said plurality of agent resources in a weighted manner to each said at least two call campaigns wherein said campaigns enjoying greater sales success receive a greater allocation of agent resources;

wherein said agent resource allocation step comprises:

assigning a campaign group pacing ratio to said campaign group;

assigning a call pacing ratio to each of said at least two call campaigns; and adjusting said call pacing ratio for each said call campaign by increasing said pacing ratio for more successful campaigns and decreasing said pacing ratio for less successful campaigns to maintain a constant campaign group pacing ratio as said campaigns are executing.

2. The method of claim 1 further comprising the step of adjusting said campaign group pacing ratio.

3. The method of claim 1 wherein said step of adjusting said call pacing ration for each call campaign comprises assigning pacing ratios reflective of relative sales success enjoyed by each call campaign in said campaign group.

4. The method of claim 1 wherein said step of adjusting said call pacing ratio for each call campaign comprises adjusting campaign pacing ratios by predetermined percentages.

5. The method of claim 4 wherein said step of adjusting said call pacing ratios by predetermined percentages comprises assigning a high pacing ratio to a top campaign and equal pacing ratios to each remaining campaign.

6. A method of prioritizing a plurality of telephone call campaigns to increase productivity of a call center including a telephony system for managing said plurality of call campaigns, said method comprising the steps of:

a. grouping at least two call campaigns into a pacing group;

b. assigning a plurality of agent resources to participate in said pacing group;

c. assigning a fraction of said assigned agent resources to each campaign in said pacing group;

d. setting an initial call pacing ratio for each call campaign based on an overall group pacing ratio and said fraction of agent resources assigned to each said call campaign;

e. establishing sales success criteria for each call campaign;

f. monitoring each call during the processing of each call campaign in said pacing group and determining if said established sales success criteria has been satisfied;

g. calculating a sales success index for each call campaign based on the recorded sales success of calls made on said call campaign;

h. adjusting said pacing ratios of at least two campaigns in said campaign group based on said sales success index calculated for each said campaign; and i. repeating steps e through h while said campaign group is being processed.

7. The method of claim 6 wherein said step of calculating said sales success index is performed at predetermined intervals.

8. The method of claim 6 wherein said step of calculating said sales success index for each call campaign comprises calculating an absolute success index based on a recorded number of success events out of a number of calls made on each said call campaign.

9. The method of claim 6 wherein said step of calculating said sales success index for each call campaign comprises calculating a relative sales success index for each call campaign based on the determined sales success of each campaign with respect to each call campaign in said campaign group.

10. An automated system for prioritizing a plurality of telephone call campaigns to increase productivity of a call center including a telephony system for managing said plurality of call campaigns, said system comprising:

a campaign sales success criteria database, for storing established sales success criteria for said plurality of call campaigns;

a call campaign sales success processor, for monitoring a plurality of calls made for said plurality of campaigns and for comparing sales results of each call with said established sales success criteria;

a call campaign prioritizer, for adjusting campaign pacing ratios for said plurality of call campaigns based on campaign sales success identified by call campaign sales success processor; and an agent resource manager, for managing a plurality of call center agent resources to ensure adequate agent resources are allocated to each call campaign included in said plurality of call campaigns.

11. A method of prioritizing a plurality of telephone call campaigns to increase productivity of a call center including a telephony system for managing said plurality of call campaigns, said method comprising the steps of:

grouping at least two call campaigns into a campaign group;

providing a plurality of call center agent resources to participate in said campaign group;

establishing success criteria based upon at least one campaign objective for each of said at least two call campaigns in said campaign group;

monitoring a plurality of calls associated with each said at least two call campaigns to determine if said established success criteria has been met based on the content of a customer contact; and allocating said plurality of agent resources in a weighted manner to each said at least two call campaigns wherein said campaigns achieving more campaign objectives receive a greater allocation of agent resources;

wherein said agent resource allocation step comprises:
  assigning a campaign group pacing ratio to said campaign group;
  assigning a call pacing ratio to each of said at least two call campaigns; and
  adjusting said call pacing ratio for each said call campaign by increasing said pacing ratio for more successful campaigns and decreasing said pacing ratio for less successful campaigns to maintain a constant campaign group pacing ratio as said campaigns are executing.

* * * * *